United States Patent [19]
Ishida

[11] Patent Number: 6,127,794
[45] Date of Patent: Oct. 3, 2000

[54] MAGNETIC RECORDING/REPRODUCING APPARATUS AND SEMICONDUCTOR INTEGRATED CIRCUIT DEVICE FOR DRIVING IT

[75] Inventor: Takuya Ishida, Kyoto, Japan

[73] Assignee: Rohm Co., Ltd., Kyoto, Japan

[21] Appl. No.: 09/497,335

[22] Filed: Feb. 3, 2000

[30] Foreign Application Priority Data

Feb. 5, 1999 [JP] Japan .................................. 11-027991

[51] Int. Cl.⁷ .................................................. G11B 27/36
[52] U.S. Cl. ............................. 318/565; 318/490; 369/53
[58] Field of Search ..................................... 318/563, 565, 318/568.24, 568.25, 625, 626, 685, 696, 53, 490; 360/31, 78.13; 369/53

[56] References Cited

U.S. PATENT DOCUMENTS

| | | | |
|---|---|---|---|
| 4,333,177 | 6/1982 | Sutterlin | 360/31 X |
| 4,789,974 | 12/1988 | Satoh et al. | 369/45 |
| 5,559,785 | 9/1996 | Honda et al. | 369/124 |
| 6,058,335 | 5/2000 | Kim | 700/108 |

*Primary Examiner*—Bentsu Ro
*Attorney, Agent, or Firm*—Arent Fox Kitner Plotkin & Kahn, PLLC

[57] ABSTRACT

In a semiconductor integrated circuit device, after electric power starts being supplied thereto, when a control circuit 2 is turned on, a test signal is fed in via a clock output terminal 6. At this time, an on/off control signal is at a low level, which causes a controller 14 to feed a low-level signal through a buffer 17 to the gate terminal G of a latch circuit 15, and thus the test signal fed through a buffer 9 to the input terminal D of the latch circuit 15 is fed from the output terminal Q thereof to the controller 14. Having received the test signal, the controller 14 recognizes establishment of a test mode and turns the on/off control signal to a high level. This causes the latch circuit 15 to stop operating, and thus the controller 14 feeds a clock through an AND circuit 16 and a buffer 8 to a clock output terminal 6 for external output.

12 Claims, 6 Drawing Sheets

MAGNETIC RECORDING/REPRODUCING APPARATUS AND SEMICONDUCTOR INTEGRATED CIRCUIT DEVICE FOR DRIVING IT

BACKGROUND OF THE INVENTION

1. Field of the Invention

The present invention relates to a magnetic recording/reproducing apparatus, such as a floppy disk drive (FDD) or hard disk drive (HDD), for reading data from and writing data to a magnetic medium, and also to a semiconductor integrated circuit device for driving such an apparatus.

2. Description of the Prior Art

A conventional semiconductor integrated circuit device (hereinafter referred to as an LSI) for driving a magnetic recording/reproducing apparatus will be described with reference to FIG. 8. The LSI 70 shown in FIG. 8 has a signal processing circuit 71 for processing the data read from a magnetic medium and for processing the data to be written to the magnetic medium, a control circuit 72 for producing control signals for controlling a spindle motor and a stepping motor that are connected externally, a large current driver 73 for supplying current for controlling the stepping motor in accordance with a control signal produced by the control circuit 72, a clock output terminal 74 for feeding out a clock for controlling the spindle motor from the control circuit 72, a control terminal 75 for feeding out a spindle on/off control signal from the control circuit 72, a test signal terminal 76 for receiving a test signal for establishing a test mode for testing the individual blocks constituting the LSI 70 one by one, output terminals 77, 78, 79, and 80 for feeding out the current supplied from the large current driver 73, a buffer 83 for feeding the signal received at the test signal terminal 76 to the control circuit 72, and buffers 81 and 82 for feeding the clock and the on/off control signal from the control circuit 72 to the clock output terminal 74 and the control terminal 75, respectively. The signal processing circuit 71 is controlled by the control circuit 72.

In general, when such an LSI 70 is checked for defects, its constituent blocks are subjected one by one to functional testing. To achieve this, various test signals corresponding to the test modes for the individual blocks are fed via the test signal terminal 76 to the control circuit 72, and the control circuit 72, recognizing those test modes, conducts testing of one block after another.

On the other hand, in recent years, to cope with the general trend toward miniaturization in magnetic recording/reproducing apparatuses, LSI chips have come to be provided with less and less pins. However, as the above-described conventional example illustrates, to conduct function-by-function testing of an LSI chip, the LSI chip needs to be provided with one to several test pins for receiving test signals that bring the LSI chip into test modes. This requires that an LSI for use in a magnetic recording/reproducing apparatus such as an FDD have 52 or more pins, and has thus been hindering the effort to reduce the number of pins thereof. Moreover, providing extra pins as such test pins inevitably increases the cost of the LSI chip.

SUMMARY OF THE INVENTION

An object of the present invention is to provide a semiconductor integrated circuit device for driving a magnetic recording/reproducing apparatus, and also a magnetic recording/reproducing apparatus employing such a semiconductor integrated circuit device, that allows a test signal for bringing the semiconductor integrated circuit device into a test mode for testing a particular function thereof to be fed to a pin that is used in normal operation.

To achieve the above object, according to one aspect of the present invention, a semiconductor integrated circuit device for driving a magnetic recording/reproducing apparatus is provided with: a control circuit for producing a drive clock for driving a spindle motor; a clock output terminal for feeding out the drive clock produced by the control circuit; a control terminal for feeding out a spindle motor on/off control signal produced by the control circuit; and a test signal holding circuit for holding temporarily a test signal that is fed in via the clock output terminal to start the testing of the individual circuits provided within the semiconductor integrated circuit device.

In this semiconductor integrated circuit device, before the semiconductor integrated circuit device starts control operations, the test signal fed in via the clock output terminal is held temporarily by the test signal holding circuit composed of a latch circuit or flip-flop, and then the test signal is read from the test signal holding circuit before the semiconductor integrated circuit device starts outputting signals. This eliminates the need to provide an input terminal dedicated to the test signal.

According to another aspect of the present invention, a magnetic recording/reproducing apparatus is provided with: a semiconductor integrated circuit device for driving a magnetic recording/reproducing apparatus as described above; and a spindle motor driven by this semiconductor integrated circuit device for driving a magnetic recording/reproducing apparatus.

According to another aspect of the present invention, a semiconductor integrated circuit device for driving a magnetic recording/reproducing apparatus, is provided with: a control circuit for producing a signal for driving a stepping motor; a plurality of output terminals for feeding out current for driving the stepping motor; a large current driver for adjusting the amount of the current fed out via the output terminals in accordance with the signal produced by the control circuit; and a test signal holding circuit for holding temporarily a test signal that is fed in via the output terminals to start the testing of the individual circuits provided within the semiconductor integrated circuit device.

In this semiconductor integrated circuit device, before the semiconductor integrated circuit device starts control operations, the test signal fed in via the output terminal connected to the large current driver is held temporarily by the test signal holding circuit composed of a latch circuit or flip-flop, and then the test signal is read from the test signal holding circuit before the semiconductor integrated circuit device starts outputting signals. This eliminates the need to provide an input terminal dedicated to the test signal.

According to another aspect of the present invention, a magnetic recording/reproducing apparatus is provided with: a semiconductor integrated circuit device for driving a magnetic recording/reproducing apparatus as described above; and a stepping motor driven by this semiconductor integrated circuit device for driving a magnetic recording/reproducing apparatus.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
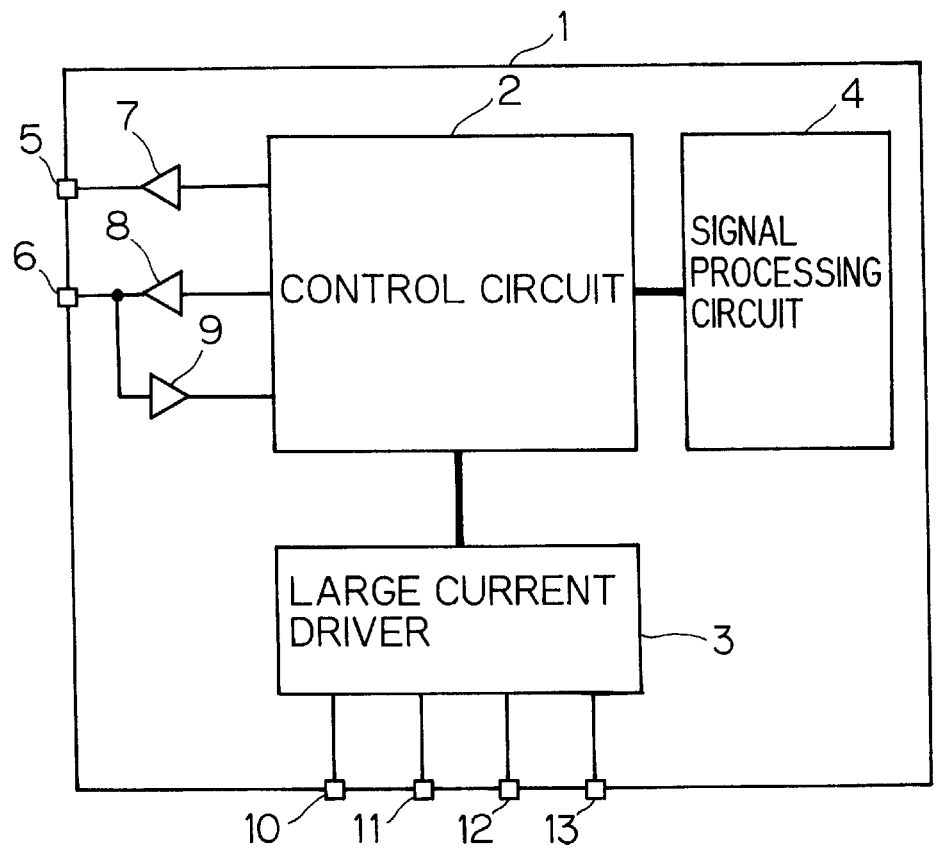
FIG. 1 is a block diagram showing an example of the internal configuration of a semiconductor integrated circuit device for driving a magnetic recording/reproducing apparatus according to the present invention.
Figure 2:
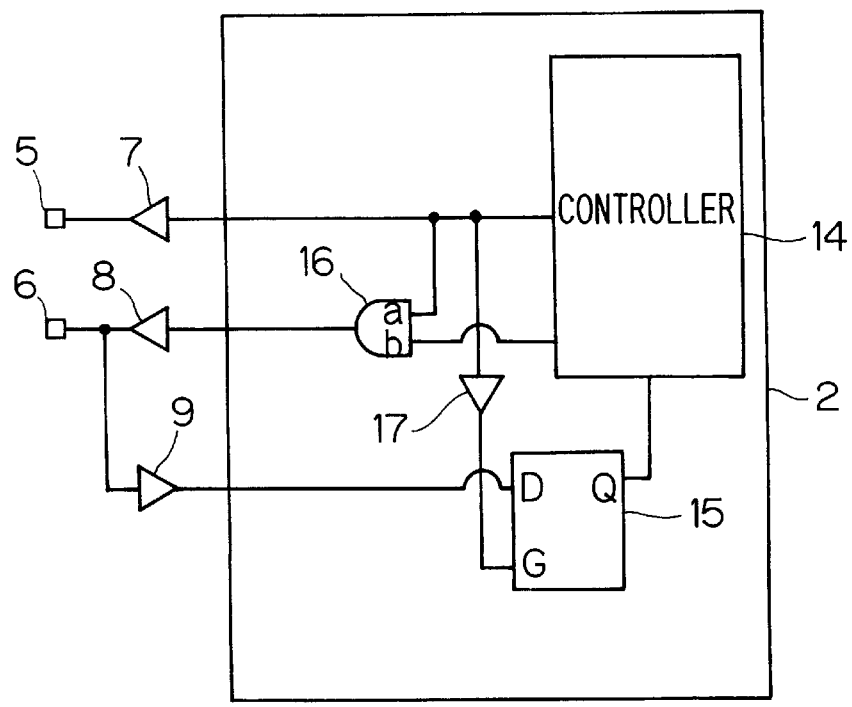
FIG. 2 is a logic circuit diagram showing an example of the internal configuration of the control circuit provided in the semiconductor integrated circuit device for driving a magnetic recording/reproducing apparatus shown in FIG. 1.
Figure 3:
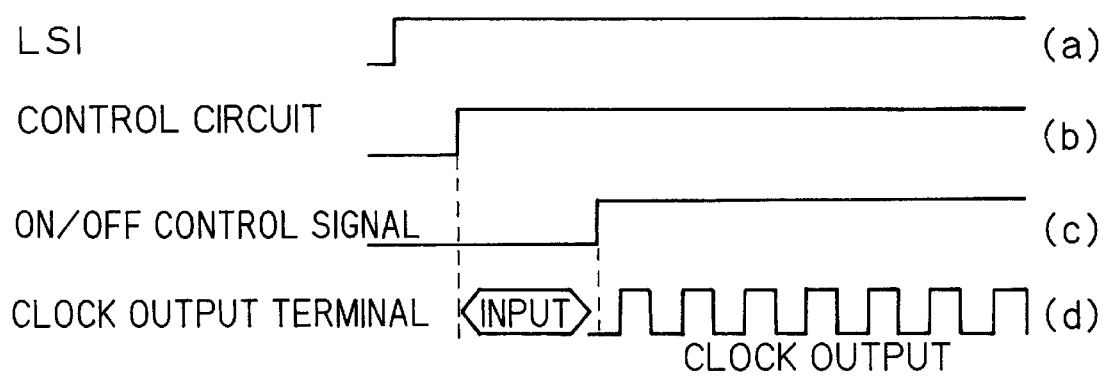
FIG. 3 is a time chart showing an example of the operation timing of the semiconductor integrated circuit device for driving a magnetic recording/reproducing apparatus provided with the control circuit shown in FIG. 2, when it receives a signal requesting establishment of a test mode.

A first example of the present invention will be described below with reference to the drawings relevant thereto. FIG. 1 is a block diagram showing the internal configuration of a semiconductor integrated circuit device for driving a magnetic recording/reproducing apparatus (hereinafter, this semiconductor integrated circuit device will be referred to as the "LSI") according to the invention. FIG. 2 is a logic circuit diagram showing the internal configuration of the control circuit provided in the LSI shown in FIG. 1. FIG. 3 is a time chart showing the operation timing of the LSI shown in FIG. 1 when it receives a signal requesting establishment of a test mode.

The LSI 1 shown in FIG. 1 has a control circuit 2 for producing control signals for controlling a spindle motor and a stepping motor that are connected externally, a large current driver 3 for supplying current for controlling the stepping motor in accordance with a control signal produced by the control circuit 2, a signal processing circuit 4 for processing the data read from a magnetic medium and for processing the data to be written to the magnetic medium, a clock output terminal 6 for feeding out a clock for controlling the spindle motor from the control circuit 2, a control terminal 5 for feeding out a spindle on/off control signal from the control circuit 2, output terminals 10, 11, 12, and 13 for feeding out the current supplied from the large current driver 3, a buffer 9 for feeding the signal received at the clock output terminal 6 to the control circuit 2, and buffers 7 and 8 for feeding the on/off control signal and the clock from the control circuit 2 to the control terminal 5 and the clock output terminal 6, respectively. The signal processing circuit 4 is controlled by the control circuit 2. Here, it is assumed that, when the on/off control signal turns to a high level, the spindle motor is turned on.

In this LSI 1, the control circuit 2 has, as shown in FIG. 2, a controller 14 for processing the signals used to control the spindle motor and the stepping motor and for controlling the entire LSI 1, a latch circuit 15 for holding temporarily the test signal fed in via the clock output terminal 6, an AND circuit 16 that receives the on/off control signal and the clock from the controller 14 and feeds a signal to the buffer 8, and a buffer 17 for feeding the on/off control signal from the controller 14 to the gate terminal G of the latch circuit 15.

Now, the operation of this LSI 1, having its control circuit 2 configured as described above, will be described with reference to FIG. 3. First, when electric power starts being supplied to the LSI 1 as shown at (a) in FIG. 3, a predetermined period of time thereafter, which is secured by a timer circuit (not shown) or the like to allow the LSI 1 to be initialized, the control circuit 2 is turned on as shown at (b) in FIG. 3. In normal operation, a predetermined period of time further thereafter, the on/off control signal is turned to a high level, and then the LSI 1 starts its normal operation. That is, in normal operation, no clock is fed out via the clock output terminal 6 while the on/off control signal is at a low level.

By contrast, when testing is conducted, when the control circuit 2 is turned on as shown at (b) in FIG. 3, a test signal is fed in via the clock output terminal 6. This test signal is then fed through the buffer 9 to the input terminal D of the latch circuit 15. For a predetermined period of time after the control circuit 2 is turned on, the on/off control signal is kept at a low level as shown at (c) in FIG. 3. As a result, during this period, a low-level signal is kept fed to the gate terminal G of the latch circuit 15, and thus the test signal fed to the input terminal D of the latch circuit 15 appears at the output terminal Q thereof intact so as to be fed to the controller 14.

When the test signal is fed to the controller 14 in this way, the control circuit 2 recognizes what function to test. Thereafter, when the spindle motor is driven in normal operation, the controller 14 turns the on/off control signal it produces to a high level as shown at (c) in FIG. 3. This signal is fed out via the control terminal 5 and is simultaneously fed to the gate terminal G of the latch circuit 15. This inhibits the signal fed to the input terminal D of the latch circuit 15 from being output from the output terminal Q thereof.

In this way, the latch circuit 15 is made to stop its operation, and the on/off control signal starts being fed to the terminal a of the AND circuit 16. As a result, the clock that is fed to the terminal b of the AND circuit 16 so as to be used to control the spindle motor is fed out via the clock output terminal 6 as shown at (d) in FIG. 3.

Figure 4:
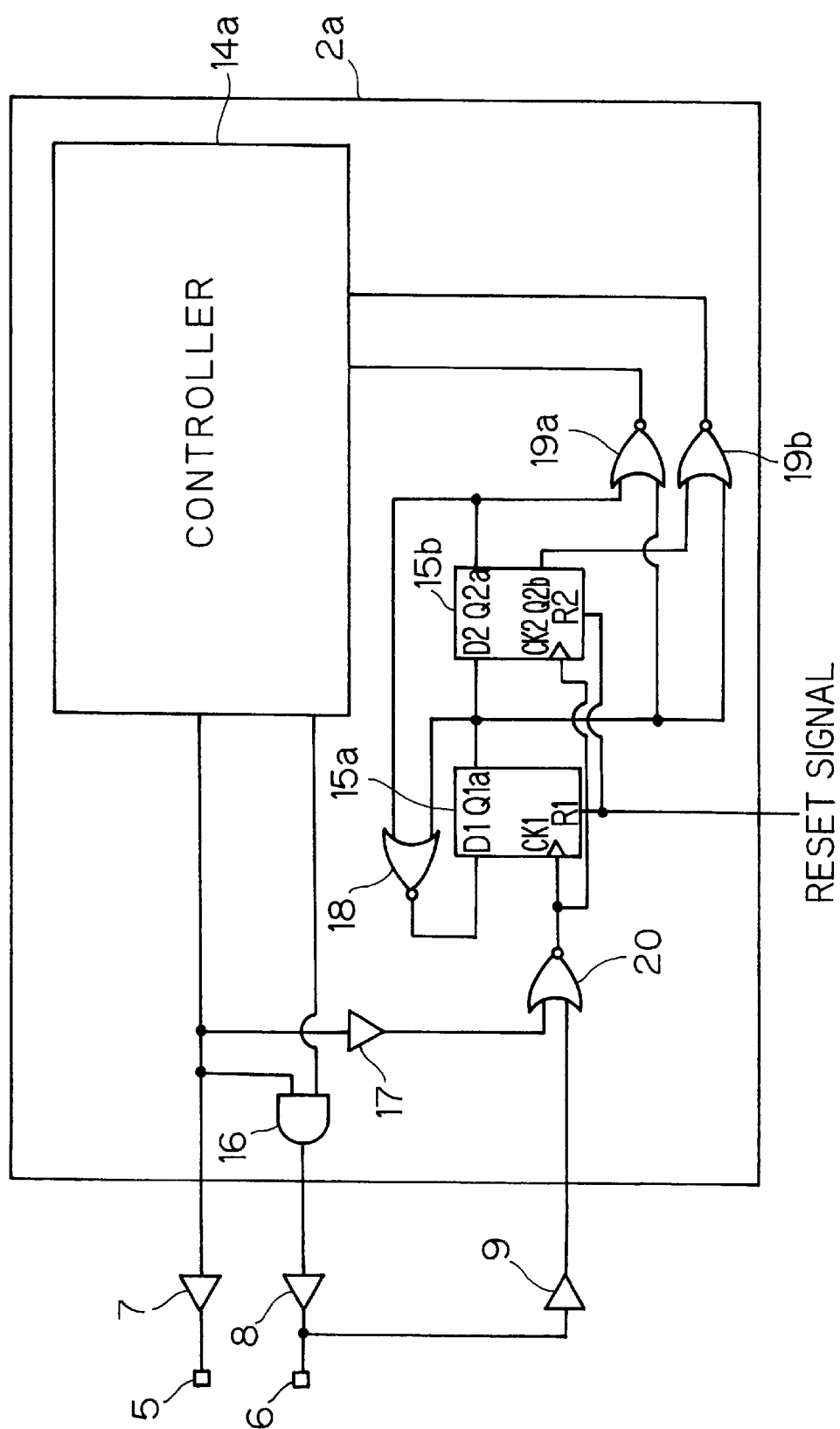
FIG. 4 is a logic circuit diagram showing another example of the internal configuration of the control circuit provided in the semiconductor integrated circuit device for driving a magnetic recording/reproducing apparatus shown in FIG. 1.

A second example of the present invention will be described below with reference to the drawings relevant thereto. FIG. 4 is a logic circuit diagram showing the internal configuration of the control circuit provided in the LSI of this example. The LSI of this example as a whole has the same block composition as that shown in FIG. 1. Therefore, the block diagram shown in FIG. 1 serves also as a block diagram showing the internal configuration of the LSI of this example, except that, in this example, the control circuit 2a shown in FIG. 4 is used in place of the control circuit 2 shown in FIG. 1.

The control circuit 2a shown in FIG. 4 has a controller 14a for processing signals used to control the spindle motor and the stepping motor and for controlling the entire LSI 1, a NOR circuit 20 that receives the test signal fed in via the clock output terminal 6 and the on/off control signal from the controller 14a through a buffer 17, flip-flops 15a and 15b that receive at their respective clock terminals CK1 and CK2 the signal fed from the NOR circuit 20, a NOR circuit 18 that receives signals from the output terminals Q1a and Q2a of the flip-flops 15a and 15b and feeds a signal to the input terminal D1 of the flip-flop 15a, a NOR circuit 19a that receives signals from the output terminals Q1a and Q2a of the flip-flops 15a and 15b and feeds a signal to the controller 14a, a NOR circuit 19b that receives signals from the output terminals Q1a and Q2b of the flip-flops 15a and 15b and feeds a signal to the controller 14a, an AND circuit 16 that receives the on/off control signal and the clock fed from the controller 14a and feeds a signal to the buffer 8, and a buffer 17.

When electric power starts being supplied to the LSI 1 (FIG. 1), having its control circuit 2a configured as described above, first a reset signal is fed to the reset terminals R1 and R2 of the flip-flops 15a and 15b, and then a clock serving as a test signal is fed in via the clock output terminal 6. At this time, the on/off control signal is at a low level, and therefore the signal fed in via the clock output terminal 6 is fed through the NOR circuit 20 to the clock terminals CK1 and CK2 of the flip-flops 15a and 15b. This causes the flip-flops 15a and 15b to feed the data at their input terminals D1 and D2 to their output terminals Q1a to Q2a. Here, the data appearing at the output terminal Q2b of the flip-flop 15b is the inverse of the data appearing at the output terminal Q2a.

This operation of the flip-flops 15a and 15b causes the NOR circuits 19a and 19b to feed signals to the controller 14a, which then recognizes what function to test in accordance with those signals. Here, the combination of the signals output from the NOR circuits 19a and 19b is determined in accordance with how many clock pulses are fed in as the test signal via the clock output terminal 6, as shown in Table 1 below. Note that Table 1 below shows the relationship between the number of clock pulses fed to the flip-flops 15a and 15b and the levels of the input to the flip-flop 15a, the outputs from the flip-flops 15a and 15b, and the outputs from the NOR circuits 19a and 19b.

TABLE 1

|  | NUMBER OF CLOCK PULSES | | |
| --- | --- | --- | --- |
|  | 1 | 2 | 3 |
| FLIP-FLOP 15a, INPUT TERMINAL D1 | HI | LOW | HI |
| FLIP-FLOP 15a, OUTPUT TERMINAL Q1 | LOW | HI | LOW |
| FLIP-FLOP 15a, OUTPUT TERMINAL Q2 | LOW | LOW | HI |
| NOR CIRCUIT 19a | HI | LOW | LOW |
| NOR CIRCUIT 19b | LOW | LOW | HI |

When this test signal is fed in, the controller 14a recognizes what test to perform or whether to perform normal operation, and then, if it recognizes normal operation as requested, the reset signal is kept fed to the reset terminals R1 and R2 of the flip-flops 15a and 15b. By contrast, if the controller 14a recognizes testing of the spindle motor control function as requested, it turns the on/off control signal to a high level to turn the spindle motor on.

When the on/off control signal is turned to a high level, the NOR circuit 20 keeps feeding a low-level signal to the clock terminals CK1 and CK2 of the flip-flops 15a and 15b, and thus the flip-flops 15a and 15b, which operate in synchronism with a clock, stop their operation. In this way, the spindle motor starts its normal operation, and the clock for controlling the spindle motor is fed out through the AND circuit 16 via the clock output terminal 6.

Figure 5:
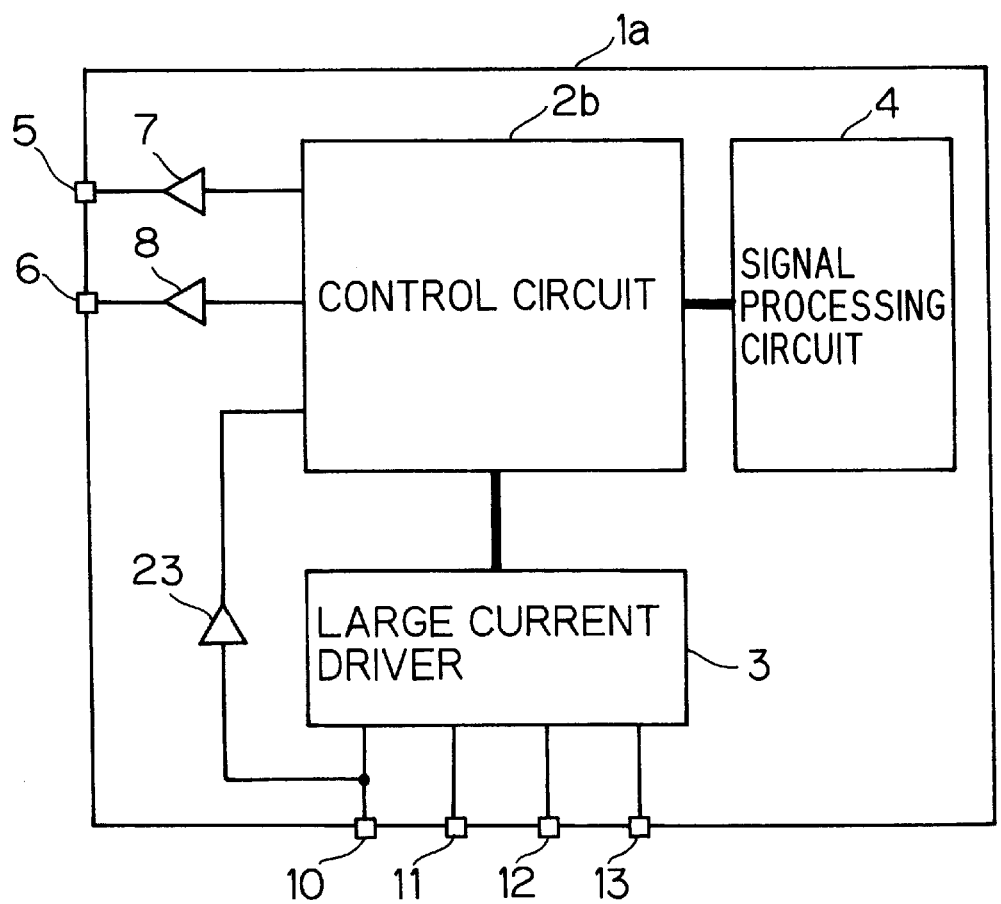
FIG. 5 is a block diagram showing another example of the internal configuration of a semiconductor integrated circuit device for driving a magnetic recording/reproducing apparatus according to the present invention.
Figure 6:
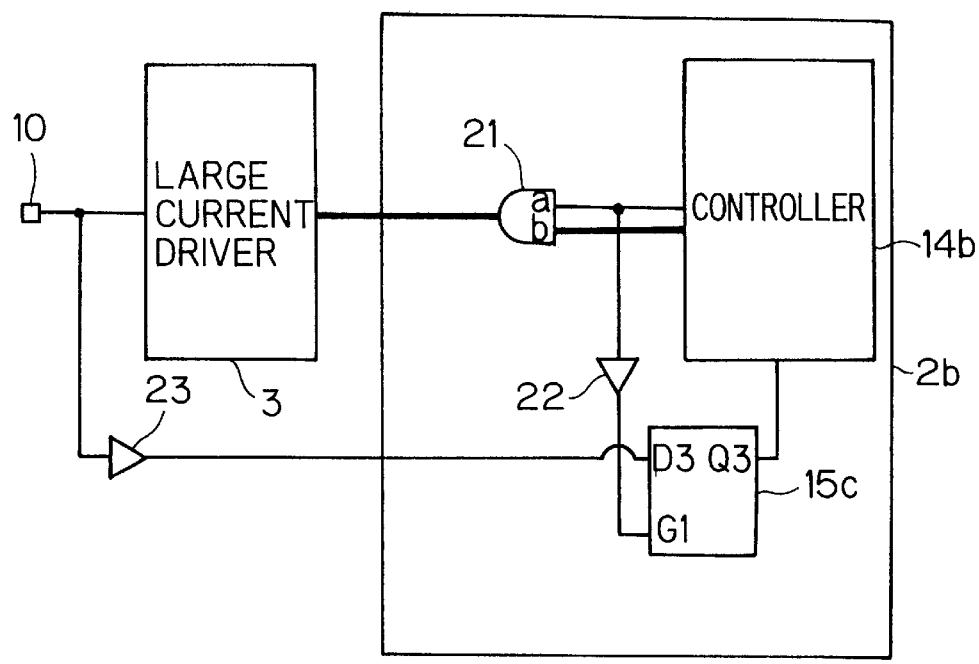
FIG. 6 is a logic circuit diagram showing the internal configuration of the control circuit provided in the semiconductor integrated circuit device for driving a magnetic recording/reproducing apparatus shown in FIG. 5.

A third example of the present invention will be described below with reference to the drawings relevant thereto. FIG. 5 is a block diagram showing the internal configuration of the LSI of this example. FIG. 6 is a logic circuit diagram showing the internal configuration of the control circuit provided in the LSI shown in FIG. 5. Note that, in the LSI 1a shown in FIG. 5, such elements as serve the same purposes as in the LSI 1 shown in FIG. 1 are identified with the same reference numerals and symbols, and the detailed descriptions thereof will not be repeated.

The LSI 1a shown in FIG. 5 has a control circuit 2b that operates substantially in the same manner as the control circuit 2 shown in FIG. 1, a large current driver 3, a signal processing circuit 4, a control terminal 5, a clock output terminal 6, buffers 7 and 8, output terminals 10, 11, 12, and 13, and a buffer 23 for feeding a test signal fed in via the output terminal 10 to the control circuit 2b.

In this LSI 1a, the control circuit 2b has, as shown in FIG. 6, a controller 14b for processing signals used to control the spindle motor and the stepping motor and for controlling the entire LSI 1a, a latch circuit 15c for holding temporarily the test signal fed in via the output terminal 10, an AND circuit 21 that receives at its terminals a and b the signal output from the controller 14b so as to be fed to the large current driver 3 and an enable signal for disabling that signal, and a buffer 22 for feeding the on/off control signal from the controller 14b to the gate terminal G1 of the latch circuit 15c.

Now, the operation of this LSI 1a, having its control circuit 2b configured as described above, will be described. First, when electric power starts being supplied to the LSI 1a, a predetermined period of time thereafter, which is secured by a timer circuit (not shown) or the like to allow the LSI 1a to be initialized, the control circuit 2b is turned on. In normal operation, a predetermined period of time further thereafter, the enable signal is turned to a high level, and the LSI 1a starts its normal operation. That is, in normal operation, no signal is fed to the large current driver 3 while the enable signal is at a low level. Thus, the large current driver 3 outputs no current.

By contrast, when testing is conducted, after the control circuit 2b is turned on, a test signal is fed in via the output terminal 10. This test signal is fed through the buffer 23 to the input terminal D3 of the latch circuit 15c. Moreover, after the control circuit 2b is turned on, as long as the enable signal is kept at a low level, a low-level signal is kept fed to the gate terminal G1 of the latch circuit 15c. This causes the test signal fed to the input terminal D3 of the latch circuit 15c to appear intact at the output terminal Q3 thereof so as to be fed to the controller 14b.

When the test signal is fed to the controller 14b in this way, the control circuit 2b recognizes what function to test. Thereafter, when testing of the stepping motor control function is conducted, the controller 14b turns the enable signal it outputs to a high level and feeds this signal to the gate terminal G1 of the latch circuit 15c. This inhibits the signal fed to the input terminal D3 of the latch circuit 15c from being output from the output terminal Q3 thereof.

In this way, the latch circuit 15c is made to stop its operation, and the enable signal starts being fed to the terminal a of the AND circuit 21. As a result, the signal fed to the terminal b of the AND circuit 21 so as to control the stepping motor is fed to the current driver 3, and thus current starts being fed out via the terminal 10.

Although a latch circuit is used in this example as shown in FIG. 6, it is also possible to use instead flip-flops configured in a similar manner to those used in the second example.

Moreover, in any of the first, second, and third examples, the test signal may be latched by a circuit configured in any other manner than those described above using flip-flops or a latch circuit.

Figure 7:
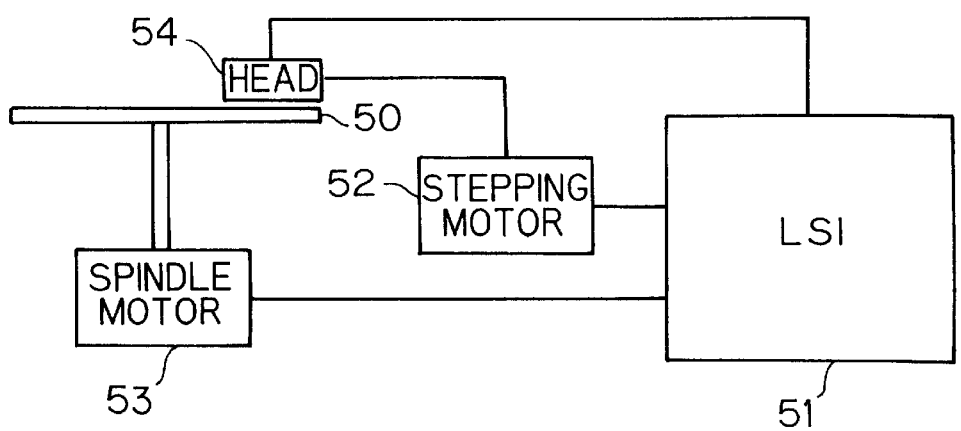
FIG. 7 is a block diagram showing the internal configuration of a magnetic recording/reproducing apparatus according to the present invention.
Figure 8:
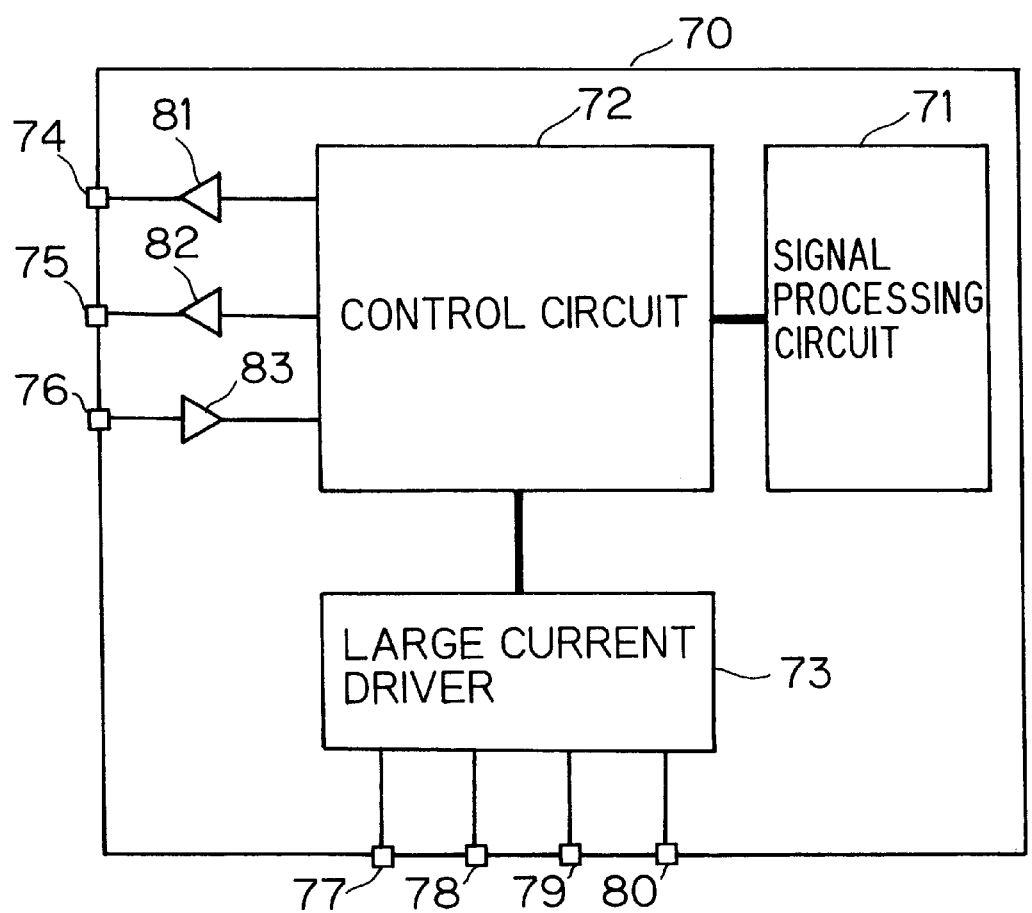
FIG. 8 is a block diagram showing the internal configuration of a conventional semiconductor integrated circuit device for driving a magnetic recording/reproducing apparatus.

FIG. 7 shows an example of a magnetic recording/reproducing apparatus employing a semiconductor integrated circuit device for driving a magnetic recording/reproducing apparatus like those of the first to third example. The magnetic recording/reproducing apparatus shown in FIG. 7 has a semiconductor integrated circuit device for driving a magnetic recording/reproducing apparatus (LSI) configured like those of the first to third examples described above, a stepping motor 52 that is driven by the large current driver 3 (FIG. 1 or 5) provided in the LSI 51, a spindle motor 53 that is driven by the clock fed out via the clock output terminal 6 (FIG. 1 or 5) of the LSI 51, and a magnetic head 54 for recording data to and reading data from a disk 50.

In this magnetic recording/reproducing apparatus, the disk 50 is rotated along its circumference by the spindle motor 53, and the magnetic head 54 is moved radially across the disk 50 by the stepping motor 52 through an intermediary member (not shown). Driving the stepping motor 52 and the spindle motor 53 in this way makes it possible to position the magnetic head 54 at a desired location on the disk 50. After the magnetic head 54 is positioned at a desired location, it is put into contact with the disk 50.

Then, when the data recorded on the disk 50 is reproduced, the reproduced signal is fed through the magnetic head 54 to the signal processing circuit 4 (FIG. 1 or 5), and thereby the data recorded on the disk 50 is reproduced. On the other hand, when data is recorded on the disk 50, the signal processing circuit 4 turns on and off the coil constituting the magnetic head 54 in accordance with the signal to be recorded, and thereby data is recorded on the disk 50.

With a semiconductor integrated circuit device for driving a magnetic recording/reproducing apparatus according to the present invention, it is possible to feed a test signal in via the clock output terminal so as to allow recognition of a test mode within the period after electric power starts being supplied to the semiconductor integrated circuit device until a clock for controlling the spindle motor starts being fed out. This eliminates the need to provide a separate input terminal dedicated to the test signal, and thus helps reduce the number of pins of the semiconductor integrated circuit device.

Moreover, using a latch circuit as the test signal holding circuit makes it possible to recognize through the latch circuit the test signal fed in via the clock output terminal within the period after the control circuit is turned on until the clock for controlling the spindle motor starts being fed out. This makes it possible to recognize even a test signal that is fed in chronologically so that the semiconductor integrated circuit device will be brought into a specific test mode corresponding thereto.

Alternatively, it is possible to feed a test signal in via the output terminal so as to allow recognition of a test mode within the period after electric power starts being supplied to the semiconductor integrated circuit device until current for controlling the stepping motor starts being fed out. This eliminates the need to provide a separate input terminal dedicated to the test signal, and thus helps reduce the number of pins of the semiconductor integrated circuit device.

Moreover, using a latch circuit as the test signal holding circuit makes it possible to recognize through the latch circuit the test signal fed in via the output terminal within the period after the control circuit is turned on until the current for controlling the stepping motor starts being fed out. This makes it possible to recognize even a test signal that is fed in chronologically so that the semiconductor integrated circuit device will be brought into a specific test mode corresponding thereto.

Moreover, it is possible to determine what function and circuit to test in accordance with the number of clock pulses that are fed in chronologically. This makes it possible to select among a plurality of test modes in accordance with the number of clock pulses, and to do so with ease.

What is claimed is:

1. A semiconductor integrated circuit device for driving a magnetic recording/reproducing apparatus, comprising:

a control circuit for producing a drive clock for driving a spindle motor;

a clock output terminal for feeding out the drive clock produced by the control circuit;

a control terminal for feeding out a spindle motor on/off control signal produced by the control circuit; and a test signal holding circuit for holding temporarily a test signal that is fed in via the clock output terminal to start testing of individual circuits provided within the semiconductor integrated circuit device, wherein, within a period after electric power starts being supplied to the semiconductor integrated circuit device until the spindle motor on/off control signal starts being fed out as a signal for driving the spindle motor via the control terminal, the test signal fed in via the clock output terminal is temporarily held by the test signal holding circuit and is then fed to the control circuit so that the control circuit, recognizing the test signal, will conduct testing of the individual circuits provided within the semiconductor integrated circuit device and then output test results.

2. A semiconductor integrated circuit device for driving a magnetic recording/reproducing apparatus as claimed in claim 1, wherein the test signal holding circuit is a latch circuit, wherein, during the period after electric power starts being supplied to the semiconductor integrated circuit device until the spindle motor on/off control signal starts being fed out as a signal for driving the spindle motor via the control terminal, the latch circuit keeps feeding the test signal fed in via the clock output terminal to the control circuit so that the control circuit will keep recognizing the test signal, and wherein, as soon as the spindle motor on/off control signal starts being fed out as a signal for driving the spindle motor, the latch circuit stops feeding the test signal to the control circuit.

3. A semiconductor integrated circuit device for driving a magnetic recording/reproducing apparatus as claimed in claim 2, wherein the test signal is a clock, and what function and circuit to test is determined in accordance with how many clock pulses the semiconductor integrated circuit device have received chronologically as the test signal.

4. A semiconductor integrated circuit device for driving a magnetic recording/reproducing apparatus, comprising:

a control circuit for producing a signal for driving a stepping motor;

a plurality of output terminals for feeding out current for driving the stepping motor;

a large current driver for adjusting an amount of the current fed out via the output terminals in accordance with the signal produced by the control circuit; and a test signal holding circuit for holding temporarily a test signal that is fed in via the output terminals to start testing of individual circuits provided within the semiconductor integrated circuit device, wherein, after electric power starts being supplied to the semiconductor integrated circuit device, within a period after the control circuit is turned on until the current for driving the stepping motor starts being fed out via the output terminals, the test signal fed in via the output terminals is temporarily held by the test signal holding circuit and is then fed to the control circuit so that the control circuit, recognizing the test signal, will conduct testing of the individual circuits provided within the semiconductor integrated circuit device and then output test results.

5. A semiconductor integrated circuit device for driving a magnetic recording/reproducing apparatus as claimed in claim 4, wherein the test signal holding circuit is a latch circuit, wherein, during the period after electric power starts being supplied to the semiconductor integrated circuit device until the current for driving the stepping motor starts being fed out via the output terminals, the latch circuit keeps feeding the test signal fed in via the output terminals to the control circuit so that the control circuit will keep recognizing the test signal, and wherein, as soon as the current for driving the stepping motor starts being fed out via the output terminals, the latch circuit stops feeding the test signal to the control circuit.

6. A semiconductor integrated circuit device for driving a magnetic recording/reproducing apparatus as claimed in claim 5, wherein the test signal is a clock, and what function and circuit to test is determined in accordance with how many clock pulses the semiconductor integrated circuit device have received chronologically as the test signal.

7. A magnetic recording/reproducing apparatus comprising:

a spindle motor; and a semiconductor integrated circuit device for driving the magnetic recording/reproducing apparatus which comprises a control circuit for producing a drive clock for driving the spindle motor, a clock output terminal for feeding out the drive clock produced by the control circuit, a control terminal for feeding out a spindle motor on/off control signal produced by the control circuit, and a test signal holding circuit for holding temporarily a test signal that is fed in via the clock output terminal to start testing of individual circuits provided within the semiconductor integrated circuit device, wherein the spindle motor is driven by the drive clock fed out from the semiconductor integrated circuit device for driving the magnetic recording/reproducing apparatus.

8. A magnetic recording/reproducing apparatus as claimed in claim 7, wherein the test signal holding circuit is a latch circuit, wherein, during the period after electric power starts being supplied to the semiconductor integrated circuit device until the spindle motor on/off control signal starts being fed out as a signal for driving the spindle motor via the control terminal, the latch circuit keeps feeding the test signal fed in via the clock output terminal to the control circuit so that the control circuit will keep recognizing the test signal, and wherein, as soon as the spindle motor on/off control signal starts being fed out as a signal for driving the spindle motor, the latch circuit stops feeding the test signal to the control circuit.

9. A magnetic recording/reproducing apparatus as claimed in claim 8, wherein the test signal is a clock, and what function and circuit to test is determined in accordance with how many clock pulses the semiconductor integrated circuit device have received chronologically as the test signal.

10. A magnetic recording/reproducing apparatus comprising:

a stepping motor; and a semiconductor integrated circuit device for driving the magnetic recording/reproducing apparatus which comprises a control circuit for producing a signal for driving the stepping motor, a plurality of output terminals for feeding out current for driving the stepping motor, a large current driver for adjusting an amount of the current fed out via the output terminals in accordance with the signal produced by the control circuit, and a test signal holding circuit for holding temporarily a test signal that is fed in via the output terminals to start testing of individual circuits provided within the semiconductor integrated circuit device, wherein the stepping motor is driven by the current fed out from the semiconductor integrated circuit device for driving the magnetic recording/reproducing apparatus.

11. A magnetic recording/reproducing apparatus as claimed in claim 10, wherein the test signal holding circuit is a latch circuit, wherein, during the period after electric power starts being supplied to the semiconductor integrated circuit device until the current for driving the stepping motor starts being fed out via the output terminals, the latch circuit keeps feeding the test signal fed in via the output terminals to the control circuit so that the control circuit will keep recognizing the test signal, and wherein, as soon as the current for driving the stepping motor starts being fed out via the output terminals, the latch circuit stops feeding the test signal to the control circuit.

12. A magnetic recording/reproducing apparatus as claimed in claim 11, wherein the test signal is a clock, and what function and circuit to test is determined in accordance with how many clock pulses the semiconductor integrated circuit device have received chronologically as the test signal.

\* \* \* \* \*